United States Patent
Takemura et al.

(10) Patent No.: US 6,565,677 B1
(45) Date of Patent: May 20, 2003

(54) ROLLING BEARING

(75) Inventors: Hiromichi Takemura, Kanagawa (JP); Yasuo Murakami, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/575,444

(22) Filed: May 22, 2000

(30) Foreign Application Priority Data

May 20, 1999 (JP) .......................................... 11-140056

(51) Int. Cl.[7] .......................... C22C 38/22; C22C 38/24
(52) U.S. Cl. ........................ 148/325; 148/906; 384/492; 384/912
(58) Field of Search ................................ 148/906, 325, 148/326; 384/492, 912

(56) References Cited

U.S. PATENT DOCUMENTS

| | | | |
|---|---|---|---|
| 5,292,200 A | 3/1994 | Matsumoto et al. | 384/492 |
| 5,338,377 A | 8/1994 | Mitamura et al. | 148/318 |
| 5,427,457 A | 6/1995 | Furumura et al. | 384/450 |
| 5,860,749 A | 1/1999 | Hirakawa et al. | 384/492 |
| 5,873,956 A | 2/1999 | Tanaka et al. | 148/318 |
| 5,998,042 A | 12/1999 | Tanaka et al. | |
| 6,143,425 A | 11/2000 | Tanaka et al. | |

FOREIGN PATENT DOCUMENTS

| | | | |
|---|---|---|---|
| DE | 3901 470 C1 | 8/1990 | C22C/38/22 |
| DE | 693 13 740 T2 | 1/1994 | |
| DE | 694 13 632 T2 | 2/1995 | |
| DE | 195 38 658 A1 | 4/1996 | |
| DE | 196 54 545 A1 | 7/1997 | F16C/33/62 |
| DE | 197 07 033 A1 | 11/1997 | C21D/9/40 |
| EP | 0 592 195 A1 | 4/1994 | |
| JP | 361163244 A * | 7/1986 | |
| JP | 3-173747 | 7/1991 | C22C/38/00 |
| JP | 6-11899 | 2/1994 | C22C/38/00 |
| JP | 7-110988 | 11/1995 | C23C/8/22 |
| JP | 08183976 A | 7/1996 | |

OTHER PUBLICATIONS

NSK Technical Journal No. 655, pp. 17–24, 1993.
Metal Handbook, revised third edition, pp. 780–797, 1970.
Kimura, Yoshitsuga and Okabe, Heihachiro: "An Outline of Tribology", pp. 150–159, published by Youkendo, 1984: Japan.
"Current Bearing Technology", pp. 18, 19, 56, 57, published by Japan Bearing Industrial Association, Aug. 10, 1996: Japan.
"Steel and Alloy Elements" (the first volumes): Japan Society for the Promotion of Science, Feb. 28, 1996, pp. 332, 335 (lines 3–21).

* cited by examiner

*Primary Examiner*—Deborah Yee
(74) *Attorney, Agent, or Firm*—Sughrue Mion, PLLC

(57) ABSTRACT

A rolling bearing includes races and rolling elements, at least the race including: 0.60 wt % to 0.95 wt % of C; 10.0 wt % to 13.0 wt % of Cr; and at least one kind of 0.5 wt % to 2.0 wt % of Mo and 0.5 wt % to 2.0 wt % of V with the balance of Fe. The surface hardness of a raceway surface of the race is not less than HRC 58, and the raceway surface of the race has a passive film with the thickness of 5 to 100 nm.

4 Claims, 1 Drawing Sheet

ROLLING BEARING

BACKGROUND OF THE INVENTION

1. Field of the Invention

The present invention relates to a rolling bearing, and particularly relates to a rolling bearing for use, for example, in an engine accessory (alternator, compressor, water pump, etc.) for a transmission or a continuously variable transmission (toroidal CVT or belt CVT) in a car, an agricultural machine, a construction machine, a steel machine, or the like under the environment where foreign matters such as metal burrs or mud are mixed so that the lubricating condition is apt to deteriorate.

2. Description of the Related Art

In the related art, high-carbon chromium bearing steel prescribed in JIS, particularly SUJ2 is generally used as material for the rolling bearings. Such material to be used is subjected to hardening and tempering treatment so that the material is used in the condition that the surface hardness HRC (Rockwell hardness) is about 62 and the residual austenite quantity is about 10 wt %.

In such a related art rolling bearing, however, if foreign matters are mixed into the lubricating oil of the bearing, the rolling life thereof is conspicuously shortened in comparison with the case where clean lubricating oil is used. In the lubricating oil, metal cuttings, shavings, burrs, scourings, muddy water, and so on, are mixed. In such an environment of use of a rolling bearing in which such foreign matters are mixed, the foreign matters cause a dent (damage) or rust on the orbital surfaces of races and rolling elements of the rolling bearing, and flaking due to the dent or rust so that the life of the rolling bearing is reduced extremely.

It is noted that the life of the rolling bearing is reduced to about ⅛ as long as that in the case where clean lubricating oil is used in accordance with the quantity, hardness and size of the foreign matters, as described in "Foreign-Matter Mixing Conditions and Rolling Fatigue Life" (NSK Technical Journal No. 655, pp. 17–24, 1993) as experimental researches about such circumstances. This means there is reproduced such a phenomenon that the orbital surface of a bearing is affected by the invasion of foreign matters and the rolling fatigue so that very small dents I a range from the order of $\mu$m to the order of one hundred $\mu$m or more are produced in the orbital surface, and flaking is developed, due to the dents, to lower the rolling life, like pitching which is seen in transmission gears in a car.

As a measure to prolong the life when such foreign matters are mixed, conventional research has sought to enhance the surface hardness of the bearing.

There is a related art example as such a measure ("Metal Handbook", edited by The Japan Institute of Metals, revised third edition, pp. 780–797) in which a bearing is manufactured by use of precipitation-hardened tool steel (SKH or SKD) in which an oxide forming element is added so that plenty of carbide is precipitated. (Hereinafter, this related art example is referred to as "related art 1")

There are other measures to prolong the life, that is, the technique of Japanese Patent Examined Publication No. Hei.6-11899 (hereinafter referred to as "related art 2"), the technique of Japanese Patent Unexamined Publication No. Hei.3-173747 (hereinafter referred to as "related art 3"), and the technique of Japanese Patent Examined Publication No. Hei.7-110988 (hereinafter referred to as "related art 4").

According to the related art 2, material consisting of 0.4 to 0.8 wt % of C, 4.0 to 8.0 wt % of Cr, 0.3 to 1.2 wt % of Si, 1.0 wt % or less of Mn, and the residue of Fe and unavoidable impurities, is subjected to carburizing or carbonitriding treatment so as to form high-chromium bearing steel which has a long life and an excellent rolling fatigue life characteristic even under the environment where foreign matters are mixed into the lubricant oil for the rolling bearing.

The related art 3 discloses a grease-charged bearing composed of high-carbon stainless steel containing Cr in a range of from 13 wt % to 18 wt % while at least a fixed race is of martensitic stainless steel.

Further, according to the related art 4, at least one of races and rolling elements is made from alloy steel containing at least C and Cr in a range of from 0.3 wt % to 0.6 wt % and in a range of from 3.0 wt % to 14 wt % respectively, and has a surface layer portion formed by carburizing or carbonitriding and further thermal hardening. In addition, the quantity of fine carbide in a surface layer portion of at least one of the races and the rolling elements is in a range of from 20 vol % to 50 vol %, and the quantity of retained austenite in the surface layer portion is in a range of from 10 vol % to 25 vol %.

In the related art 1, there is indeed an advantage that the hardness of the rolling surface becomes high enough so that the rolling surface is hardly dented by foreign matters in the lubricating oil. On the other hand, precipitated carbide becomes bulky in accordance with the content of alloy elements to form the carbide. Accordingly, there is a fear that stress is concentrated around the carbide, and flaking breaks out from the stress-concentrated portion, so that the life is shortened.

In addition, in the related art 2, expensive heat treatment such as carburizing or carbonitriding treating is required so that the cost increases. In addition, since Cr is contained only in a range of from 4.0 wt % to 8.0 wt %, a passive film only about several $\mu$m thick is formed on the race surface when muddy water is mixed. As a result, it may be considered that the passive film is broken by the dent due to pressure of foreign matters, or rust is generated to cause pitting. Thus, a satisfactory effect cannot be expected.

In addition, in the related art 3, 13Cr-0.7% C steel SUS440A, 18Cr-1% C steel SUS440C, or 13Cr-0.3% C steel SUS420J2, each having a tempered martensitic structure, is used as the martensitic stainless steel so that the resistance to hydrogen embrittlement is enhanced by a passive film. However, SUS420J2 having the surface hardness HRC of 52 is not sufficient for rolling fatigue. In addition, SUS440A and SUS420J2 do not have additive V or Mo for forming fine carbide, and it is inevitable that bulky eutectic carbide the size of which is larger than 10 $\mu$m is apt to be precipitated on the rolling surface. In addition, there are not only a problem that flaking is produced in the rolling surface, but also a problem that the passive film becomes easy to be broken so that the resistance to corrosion is lowered and further the workability in manufacturing bearings is also deteriorated.

Further, in the related art 4, since expensive heat treatment such as carburizing or carbionitriding is required, further improvement is desired.

SUMMARY OF THE INVENTION

The present invention was developed in consideration of foregoing circumstances. It is an object of the present invention to provide a rolling bearing in which a firm passive film is formed on a race so as to well prevent flaking in early stages and prolong the bearing life on a large scale even under a poor lubricating environment where foreign matters or muddy water is mixed.

In order to achieve the above object, there is provided a rolling bearing including races and rolling elements, at least the race including: 0.60 wt % to 0.95 wt % of C; 10.0 wt % to 13.0 wt % of Cr; and at least one kind of 0.5 wt % to 2.0 wt % of Mo and 0.5 wt % to 2.0 wt % of V with the balance or Fe. The surface hardness of a raceway surface of the race is not less than HRC 58, and the raceway surface of the race has a passive firm with the thickness of 5 to 100 nm.

In addition, fine Mo or V carbide the size of which is in a range of from 30 nm to 300 nm s dispersed and precipitated at least on the raceway surface of the races.

Moreover, eutectic carbide the size of which is larger than 10 μm is restrained from being produced at least on the raceway surface of the races in heat treatment.

The inventors of this application made various investigations about rolling bearings which were resistant to foreign matters, resistant to water and long in life in the state where stress was applied to the rolling bearings. As a result, the inventors obtained various knowledge about the relationship among the contents of respective elements and each of surface hardness, corrosion resistance, temper-softening resistance and passive film of a race, and attained the invention on the basis of this knowledge.

Description will be made about the effects of contained elements used in the present invention, the critical significance of their contents, and so on.

C (carbon) is an element for giving surface hardness required in a rolling bearing. 0.6 wt % or more of C is indispensable to obtain the surface hardness HRC of 58 or more. On the other hand, if the content of C is larger than 0.95 wt %, the matrix is made into martensite so that the hardness after hardening and tempering is improved. From the point of view of corrosion resistance, however, the smaller the content of C is, the better. This is because Cr forms bulky eutectic carbide in manufacturing steel if a large quantity of C is added. As a result, the Cr density is insufficient in the matrix so that enough corrosion resistance cannot be obtained, and the rolling life or the toughness is reduced. Particularly, it is preferable that the content of C is in a range of from 0.60 wt % to 0.95 wt %.

Cr (chromium) is the most effective element to give corrosion resistance to steel. If 10.0 wt % or more of Cr is contained, good corrosion resistance is obtained and a passive film is formed to be 5 nm or more thick. On the other hand, if the content of Cr is larger than 13 wt %, the corrosion resistance is further enhanced. However, if Cr is added beyond its necessity, δ-ferrite is produced so as to embrittle the steel easily. As a result, the toughness is reduced, and the workability is lowered conspicuously. In order to form a firm passive film the thickness of which is in a range of from 5 nm to 100 nm, it is sufficient to set the upper limit of the content of Cr to be 13 wt %. It is therefore preferable that the content of Cr is in a range of from 10.0 wt % to 13.0 wt %.

Mo (molybdenum) is an element having an effect to increase hardenability and temper-softening resistance conspicuously, having an effect to delay structural deformation caused by rolling fatigue, and further enhancing corrosion resistance. If the content of Mo is smaller than 0.5 wt %, the effects are not sufficient. In order to disperse fine Mo carbide the size of which is in a range of from 50 nm to 300 nm, 0.5 wt % or more of Mo is required. However, if excessive amount of Mo is added, the toughness and the workability are lowered. It is therefore preferable that the upper limit of the content of Mo is set to be 2.0 wt %, and the content of Mo is in a range of from 0.5 wt % to 2.0 wt %.

V (vanadium) is an element for forming fine carbide and nitride. V has not only an effect to restrain the formation of Cr carbide and nitride but also an effect to enhance hardness due to secondary precipitation in a tempering process at 400 to 550° C. so as to have an effect to enhance strength conspicuously. In addition, 0.5 wt % or more of V is required for dispersing and precipitating fine V carbide the size of which is in a range of 50 nm to 300 nm so that bulky carbide having the size of 10 μm or more is restrained from being produced. In consideration of the cost and the workability, it is preferable that the upper limit, of the content of V is set to be 2.0 wt %, and the content of V is in a range of from 0.5 wt % to 2.0 wt %.

On the other hand, Si (silicon) is an element to improve the delay in structural deformation, the hardenability and the temper-softening resistance. If the content of Si is smaller than 0.2 wt %, the effect is not sufficient. If the content of Si is larger than 1.5 wt %, the workability deteriorates conspicuously. Particularly, it is therefore preferable that the content of Si is in a range of from 0.2 wt % to 1.5 wt %.

Mn (manganese) is an element required as deoxidizer in steel making. 0.2 wt % or more of Mn is necessary. But if a large quantity of Mn is added, forgeability and machinability deteriorate conspicuously, and Mn coexists with impurities such as S, P, and so on, so as to lower corrosion resistance. It is therefore preferable that the upper limit of the content of Mn is set to be 1.0 wt %, and the content of Mn is in a range of from 0.2 wt % to 1.0 wt %.

Further, it is preferable that the content of O (oxygen) is not larger than 10 ppm because oxide enclosures which reduce the rolling life are restrained from beige produced. The con en of each of S (sulfur) and P (phosphorus) is preferably in a range of not larger than 0.02 wt %.

Here, for example, when a race, is heated and hardened at 1,000 to 1,200° C. and then tempered at a high temperature (400 to 550° C.), fine Mo/V carbide is precipitated on the race and bulky eutectic carbide is restrained from being produced so that a firm passive film is formed. However, even if the race is tempered at a low temperature (180 to 220° C.), bulky eutectic carbide is not produced, and a firm passive film is formed.

On the other hand, if bulky eutectic carbide the size of which is 10 μm or more is produced on the race, portions having a passive film formed therein and portions having no passive film are produced. As a result, flaking due to corrosive pitting or due to the eutectic carbide is apt to arise. However, if eutectic carbide the size of which is larger than 10 μm is restrained from being produced on the race in heat treatment as in the present invention, a passive film is formed uniformly over the race so that the life is prolonged.

DETAILED DESCRIPTION OF THE PREFERRED EMBODIMENTS

Figure 1:
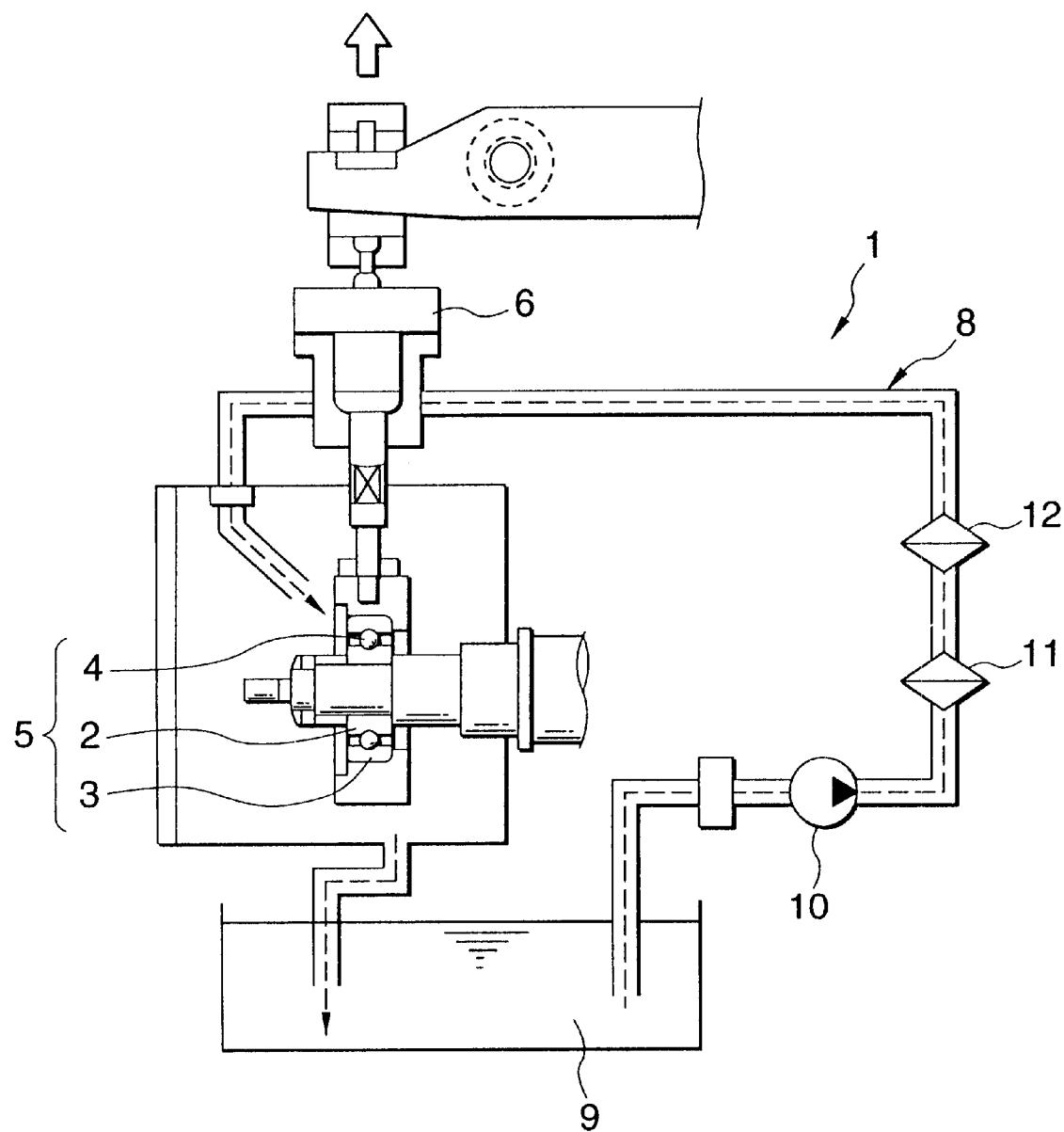
FIG. 1 is a view showing the outline of a cantilever life tester used in the present invention.

Description will be described below about the mode for carrying out the present invention.

Tables 1 and 2 show chemical components of specimens used in invention examples and comparative examples.

TABLE 1

| Sp. | C | Cr | Si | Mn | Mo | V | tempering temperature |
|---|---|---|---|---|---|---|---|
| Inv. Ex. 1 | 0.60 | 10.0 | 0.2 | 0.3 | — | 2.0 | 220° C. |
| 2 | 0.95 | 12.5 | 0.3 | 0.2 | 2.0 | — | 200° C. |
| 3 | 0.80 | 11.0 | 1.0 | 0.8 | 0.5 | — | 180° C. |
| 4 | 0.65 | 13.0 | 0.5 | 1.0 | 0.5 | 2.0 | 550° C. |
| 5 | 0.70 | 11.0 | 1.5 | 0.3 | — | 0.5 | 450° C. |
| 6 | 0.60 | 12.0 | 0.2 | 0.4 | 1.5 | 1.0 | 400° C. |

Incidentally, the values of the respective chemical components in Table 1 are expressed by wt %. In addition, Sp. 1 to 6 designate specimen numbers in the inventive example.

TABLE 2

| Sp. | C | Cr | Si | Mn | Mo | V | tempering temperature |
|---|---|---|---|---|---|---|---|
| Comp. Ex. 1 | 1.05 | 1.50 | 0.3 | 0.3 | — | — | 180° C. |
| 2 | 1.15 | 16.5 | 0.5 | 0.4 | 0.5 | — | 180° C. |
| 3 | 0.70 | 14.5 | 0.6 | 0.5 | — | — | 200° C. |
| 4 | 0.40 | 18.0 | 1.2 | 0.2 | 0.5 | 0.5 | 200° C. |
| 5 | 0.45 | 12.5 | 0.6 | 1.0 | — | 1.0 | 450° C. |
| 6 | 0.80 | 8.00 | 0.3 | 0.5 | 1.0 | — | 180° C. |
| 7 | 0.65 | 12.5 | 0.2 | 0.4 | 0.3 | — | 200° C. |
| 8 | 0.75 | 10.5 | 1.0 | 0.4 | — | 0.2 | 400° C. |

Incidentally, the values of the respective chemical components in Table 2 are expressed by wt %. In addition, Sp. 1 to 8 designate specimen numbers in he comparative example.

To test the lives of the inventive and comparative examples, a plurality of kinds of rolling bearings each having inner and outer races consisting of the materials shown in Tables 1 and 2 were manufactured. The races of each rolling bearing were subjected to normal heat treatment (heated and hardened at 1,000 to 1,200° C., and hen tempered at a predetermined temperature with or without sub-zero treatment) so that the surface hardness HRC was 55 to 65, the retained austenite quantity was 0.5 to 15 wt %, and the surface roughness was 0.01 to 0.04 μmRa. On the other hand, SUJ2 was used for rolling elements of the respective rolling bearings both in the inventive example and in the comparative example so that the rolling elements had the surface hardness HRC of 61 to 63, the retained austenite quantity of 10 wt %, and the surface roughness of 0.0003 to 0.010 μmRa after heat treatment.

Next, Tables 3 and 4 show the results of the life test given to the rolling bearings in the inventive and comparative examples.

The results of the life test were obtained with a test machine (cantilever life tester) 1 shown in FIG. 1, and deep groove ball bearings (6206 type) 5 each having an inner race 2, an outer race 3 and a plurality of rolling elements 4 were adopted as rolling bearings to be tested. In addition, a test load Fr by a loading apparatus 6 was 900 kgf, and the test rotational speed for each deep groove ball bearing 5 by a rotator 7 was 3,900 rpm. Turbine oil VG68 was used as lubricating oil.

In the first stage of the test, 0.005 g of stainless steel powder which was 10 to 20 μm in particle size was dispersed in 1,000 cc of the lubricating oil VG68 so that, for example, the surface of the outer race 3 was provided with initial dents. Then, the bearing 5 was cleansed, and only the inner race 2 and the rolling elements 4 were exchanged for new ones of bearing steel. The outer race 3 with dents, the new inner ring 2 and the new rolling elements 4 were assembled. Respective 10 specimens assembled thus in each example were subjected to a durability test while a predetermined quantity of lubricating oil was fed from a lubricating oil feed line 8. Incidentally, the lubricating oil feed line 8 dropped service-water at 5 cc/hr into an oil tank 9 reserving the lubricating oil VG68 in which no foreign matter was mixed. The lubricating oil sucked up from the oil tank 9 by a pump 10 was passed through filters 11 and 12 before being fed to the deep groove ball bearing 5.

Incidentally, the test was terminated on the basis of judgment as to whether the vibration level reached 5 times as high as its initial value. The test was discontinued at that time, and flaking was ascertained. The calculated life of the bearing at that time was 45 hours. Therefore, the time to terminate the test was set to be 150 hours which was about 3 times as long as the calculated life.

TABLE 3

| Sp. | Surface hardness HRC | average size of Mo/V carbide nm | eutectic carbide size μm | γR % | passive film thickness nm | $L_{10}$ life hr | Damage state |
|---|---|---|---|---|---|---|---|
| Inv. Ex. 1 | 60 | 300 | 5 or less | 12 | 5 | 150→ | ◯ |
| 2 | 63 | 215 | 2 or less | 10 | 30 | 150→ | ◯ |
| 3 | 61 | 180 | 5 or less | 15 | 15 | 150→ | ◯ |
| 4 | 65 | 130 | 2 or less | 0.5 | 100 | 150→ | ◯ |
| 5 | 58 | 50 | 2 or less | 2.0 | 55 | 150→ | ◯ |
| 6 | 59 | 100 | 2 or less | 1.0 | 70 | 150→ | ◯ |

γR . . . retained austenite quantity
150→ . . . life beyond 150 hr
◯ . . . no flaking

TABLE 4

| Sp. | surface hardness HRC | Average size of Mo/V carbide nm | eutectic carbide size μm | γR % | passive film thickness nm | $L_{10}$ life hr | damage state |
|---|---|---|---|---|---|---|---|
| Comp. Ex. 1 | 62 | — | 3 or less | 7 | 1 | 12 | ● |
| 2 | 65 | 550 | 15 or more | 10 | 3 | 13 | ● |
| 3 | 64 | — | over 10 | 15 | 100 | 35 | ● |
| 4 | 59 | 450 | 15 or more | 12 | 2 | 15 | ● |
| 5 | 56 | 150 | 5 or less | 1.0 | 55 | 9 | ●* |
| 6 | 62 | 205 | 2 or less | 11 | 3 | 29 | ● |
| 7 | 61 | 425 | over 10 | 10 | 3 | 23 | ● |
| 8 | 62 | 500 | over 10 | 0.5 | 3 | 21 | ● |

γR . . . retained austenite quantity
● . . . outer ring flaking caused in all the 10 specimens
●* . . . inner and outer rings flaking As is apparent from the results of the life test in Tables 3 and 4, the bearing surface hardness HRC was high to be 60, 63 and 31, and the retained austenite quantity γR was high to be 12, 10 and 15 wt % the inventive examples 1 to 3 respectively. Therefore, the degree of the surface damage caused by foreign matter dents was relaxed so that the passive film on the surface was restrained from being broken. In addition, fine Mo/V carbide the average particle size of which was 300, 215 and 180 nm was precipitated. As a result, eutectic carbide the size of which was larger than 5 μm was restrained from being produced, and a firm passive film was formed uniformly to be 5, 30 and 15 nm thick.

According to the observation of each orbital surface after the test was terminated, the state of the surface was excellent, and no flaking was produced in each outer race even when the test time reached 150 hours.

In the inventive examples 4, 5 and 6, since the specimens are tempered at a high temperature of 400° C. or more, fine Mo/V carbide the average particle size of which was 130, 50 and 100 nm was precipitated by the secondary precipitation effect, and the retained austenite quantity γR was small to be 0.5, 2.0 and 1.0 wt % respectively. Severe initial dents were, however, restrained from being formed on each race surface so that the passive film was restrained from being broken. In addition, the passive film was formed uniformly to be 100, 55 and 70 nm thick. According to the observation on each orbital surface after the test was terminated, the state of the surface was excellent, and no flaking was produced in each outer race of each specimen even when the test time reached 150 hours.

On the other hand, in the comparative example 1, the test was performed with normal SUJ2. Although the retained austenite quantity γR was 7% and the surface hardness HRC was 62, the passive film became thin to be 1 nm because the Cr content was 1.5%. Therefore, flaking due to corrosive pitting and flaking due to dents were mixed in each outer race loaded area, of all the 10 specimens, where water was apt to be collected, so that the $L_{10}$ life became 12 hr, which was shorter than the calculated life (45 hr).

In the comparative examples 2 and 4, the Cr content was large to be 16.5 wt % and 18 wt % respectively, so that a large quantity of bulky eutectic carbide the size of which was 15 μm or more was produced on the bearing race surface in each example. As a result, the passive film was not formed uniformly, that is, portions with the passive film the thickness of which was not smaller than 5 μm and portions with no passive film were mixed so that the average thickness of the passive film was 3 nm and 2 nm respectively. Thus, flaking due to corrosive pitting and flaking in the surface due to the eutectic carbide were produced in each outer race of all the 10 specimens in each example, so that the $L_{10}$ lives became 13 hr and 15 hr respectively.

In the comparative example 3, the Cr content was large to be 14.5 wt %, so that eutectic carbide the size of which was 10 μm or more was produced. As a result, the average thickness of the passive film was 100 nm. However, the passive film was brittle locally and easy to be broken. Thus, he passive film did not remain on each race after the test, and flaking due to corrosive pitting was produced in each outer race of all the 10 specimens, so that the $L_{10}$ life became 35 hr.

In the comparative example 5, the eutectic carbide size was 5 μm or less, and he passive film thickness was 55 nm. However, the bearing surface hardness HRC after heat treatment became low to be 56 because 0.45 wt % of C was contained. As a result, plastic deformation due to rolling fatigue was accelerated, and flaking was produced in inner and outer races of all the 10 specimens, so that the $L_{10}$ life became 9 hr, which was shortest.

In the comparative example 6, fine Mo/V carbide the particle size of which was 205 nm was precipitated. As a result, eutectic carbide the particle size of which was 2 μm or less was produced. However, since the Cr content was small to be 8 wt %, the passive film was thin to be 3 nm. As a result, flaking due to corrosive pitting was produced in each outer race of all the 10 specimens, so that the $L_{10}$ life became 29 hr.

In the comparative examples 7 and 8, the C content was large to be 0.65 wt % and 0.75 wt % respectively so that the sufficient surface hardness HRC of 61 and 62 after heat treatment was obtained, and the Cr content was 12.5 wt % and 10.5 wt % respectively. However, the precipitation of fine Mo/V carbide was large to be 425 nm and 500 nm. As a result, eutectic carbide the size of which was larger than 10 μm was confirmed. Therefore, the passive film was not formed uniformly, that is, portions with the passive film the thickness of which was not smaller than 5 μm and portions with no passive film were mixed so that the average thickness of the passive film was 3 nm. Thus, flaking due to corrosive pitting was produced in each outer race of all the 10 specimens, so that $L_{10}$ lives became 23 hr and 21 hr respectively.

From the above results, the following effects have been confirmed. That is, at least a fixed race is configured such that C in a range of from 0.60 wt % to 0.95 wt % and Cr in a range of from 10.0 wt % to 13.0 wt % are contained, at least one kind of Mo in a range of from 0.5 wt % to 2.0 wt % and V in a range of 0.5 wt % to 2.0 wt % is added so that fine Mo or V carbide the size of which is in a range of from 50 nm to 300 nm is dispersed and precipitated, and further the residue contains Fe and unavoidable impurities are contained. Then, the surface hardness HRC after heat treatment becomes 58 or more, and eutectic carbide the size of which is 10 μm or more is removed from the race. Thus, a firm passive film 5 to 100 nm thick is formed on the race surface. The passive film is restrained from being broken even if foreign matters of about 5 ppm are mixed. It is therefore possible to provide a long-life bearing in which flaking due to corrosive pitting is prevented from occurring.

In addition, alloy elements such as Al, Nb, Ti, etc. other than Mo and V may be added and dissolved in steel so that fine carbide is dispersed and precipitated. A similar long-life effect is obtained also in the case where carbide having the size of 50 to 300 nm is precipitated.

Further, if such steel is baked or heated and hardened in a vacuum furnace in order to dehydrogenate the steel, the diffusible hydrogen quantity in the steel becomes 0.1 ppm or less. Therefore, an effect to restrain factors of cracking due to flaking is obtained.

Incidentally, under the environment where foreign matters are often mixed, it is preferable that the retained austenite quantity γR is set to be in a range of from 10% to 15% in order to restrain the passive film from being broken.

In addition, under the environment where foreign matters of 5 ppm or less are mixed and the atmospheric temperature becomes high, the dimensional stability is subject of discussion. It is therefore preferable that the retained austenite quantity γR is set to be 2% or less.

Further, in this test, inner and outer races were manufactured out of materials within a scope of claims of the present invention. In consideration of the cost, however, only the outer race where flaking is often produced is manufactured out of such materials while the inner race and the rolling elements may be manufactured with normal bearing steel.

While only certain embodiments of the invention have been specifically described herein, it will apparent that numerous modifications may be made thereto without departing from the spirit and scope of the invention.

As has been described above, according to a rolling bearing in the present invention, it is possible to set the surface hardness HRC of a race to be 58 or more and fine Mo/V carbide is precipitated so that bulky eutectic carbide is restrained from being produced. As a result, flaking due to corrosive pitting is remarkably prevented from being produced in early stages, and there is formed a firm passive film which is superior in abrasion resistance. It is therefore possible to prolong the rolling life on a large scale in comparison with that in the related art.

The present disclosure relates to the subject matter contained in Japanese patent application No. Hei.11-140056 filed on May 20, 1999 which is expressly incorporated herein by reference in its entirety.

What is claimed is:

1. A rolling bearing having races and rolling elements, at least said race comprising: 0.60 wt % to 0.95 wt % of C; 10.0 wt % to 13.0 wt % of Cr; and at least one kind of 0.5 wt % to 2.0 wt % of Mo and 0.5 wt % to 2.0 wt % of V with the balance of Fe, wherein the surface hardness of a raceway surface of said recess is not less than HRC 58, and wherein the raceway surface of said races has a passive film with the thickness of 5 to 100 nm, wherein the passive film corresponds to a dense oxide layer which protects the raceway surface against corrosion in association with chromium.

2. The rolling bearing according to claim 1, wherein at least one of fine Mo carbide and fine V carbide, the size of which is in a range of from 50 nm to 300 nm, is dispersed and precipitated at least on the raceway surface of said races.

3. The rolling bearing according to claim 1, wherein eutectic carbide, the size of which is larger than 10 $\mu$m, is restrained from being produced at least on the raceway surface of said races in heat treatment.

4. The rolling bearing according to claim 2, wherein eutectic carbide, the size of which is larger than 10 $\mu$m, is restrained from being produced at least on the raceway surface of said races in heat treatment.

* * * * *